United States Patent
Anderson

(10) Patent No.: US 11,785,439 B2
(45) Date of Patent: *Oct. 10, 2023

(54) INTEGRATED EMERGENCY EVENT DETECTION AND MAPPING USING INDIVIDUALIZED DEVICE LOCATION REGISTRATIONS

(71) Applicant: Zoom Video Communications, Inc., San Jose, CA (US)

(72) Inventor: Walter F. C. Anderson, Santa Cruz, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,737

(22) Filed: Jan. 29, 2021

(65) Prior Publication Data

US 2022/0248204 A1 Aug. 4, 2022

(51) Int. Cl.
*H04W 8/04* (2009.01)
*H04W 4/90* (2018.01)
*H04W 4/02* (2018.01)
*H04W 4/021* (2018.01)
*H04W 4/029* (2018.01)

(52) U.S. Cl.
CPC .............. *H04W 4/90* (2018.02); *H04W 4/021* (2013.01); *H04W 4/023* (2013.01); *H04W 4/029* (2018.02)

(58) Field of Classification Search
CPC ....... H04W 4/90; H04W 4/029; H04W 4/021; H04W 4/023
See application file for complete search history.

(56) References Cited

U.S. PATENT DOCUMENTS

| | | |
|---|---|---|
| 7,245,704 B2 | 7/2007 | Binning |
| 8,526,576 B1 | 9/2013 | Deich et al. |
| 8,624,727 B2 | 1/2014 | Saigh et al. |
| 9,218,432 B2 | 12/2015 | Miasnik et al. |
| 9,553,992 B1 | 1/2017 | Harnisch |

(Continued)

OTHER PUBLICATIONS https://www.cisco.com/c/en/us/products/collateral/unified-communications/emergency-responder/datasheet-78-741535.pdf, Cisco Emergency Responder 12.5, 8 pages, 2018.

*Primary Examiner* — Dai Phuong
(74) *Attorney, Agent, or Firm* — Young Basile Hanlon & MacFarlane, P.C.

(57) ABSTRACT

A software platform includes emergency event processing functionality for detecting and mapping emergency event occurrences. The emergency event processing includes device location registration functionality for allowing operators of the software platform to register locations of their devices. Information associated with the operator-entered location information is stored alongside network device information. When an emergency call is placed by a device registered with the software platform, the software platform identifies network device information for the device placing the emergency call and searches records generated based on the operator-indicated device locations. A location determined thereby is then signaled to a public safety answering point. This automated signaling can improve an emergency response by directing dispatched responders to a specific location verified by the operator of the device, rather than an assumed location specified by an administrator which may not actually be accurate.

20 Claims, 12 Drawing Sheets

(56) References Cited

U.S. PATENT DOCUMENTS

| | | | |
|---|---|---|---|
| 9,706,350 B2 | 7/2017 | Ling | |
| 9,942,739 B2 | 4/2018 | Bozik et al. | |
| 10,044,857 B2 | 8/2018 | Philbin | |
| 10,708,441 B1* | 7/2020 | Evans | H04M 11/06 |
| 10,728,392 B1* | 7/2020 | Chandrakant | H04L 67/54 |
| 10,735,936 B1 | 8/2020 | Macxis | |
| 11,013,042 B1* | 5/2021 | Vendrow | H04W 76/10 |
| 11,190,642 B1* | 11/2021 | Yanes | H04M 3/4288 |
| 11,323,565 B1 | 5/2022 | Anderson et al. | |
| 2006/0068753 A1 | 3/2006 | Karpen et al. | |
| 2008/0139222 A1* | 6/2008 | Falvo | H04L 67/63 455/456.3 |
| 2008/0200143 A1 | 8/2008 | Qiu et al. | |
| 2009/0003312 A1 | 1/2009 | Velazquez et al. | |
| 2009/0291663 A1 | 11/2009 | Schultz et al. | |
| 2009/0325595 A1 | 12/2009 | Farris | |
| 2011/0121963 A1 | 5/2011 | Prehofer | |
| 2011/0151829 A1 | 6/2011 | Velusamy et al. | |
| 2012/0170719 A1 | 7/2012 | Nelson | |
| 2012/0236760 A1* | 9/2012 | Ionescu | H04L 65/1069 370/259 |
| 2014/0146171 A1 | 5/2014 | Brady et al. | |
| 2016/0049064 A1 | 2/2016 | McNabb et al. | |
| 2017/0060353 A1* | 3/2017 | Blanchard | G06F 3/0482 |
| 2017/0169699 A1 | 6/2017 | Will et al. | |
| 2018/0122030 A1 | 5/2018 | Raz et al. | |
| 2019/0320310 A1 | 10/2019 | Horelik et al. | |
| 2019/0357031 A1 | 11/2019 | Wickham | |
| 2020/0037142 A1 | 1/2020 | Lofton | |
| 2020/0068351 A1* | 2/2020 | Galvez | H04W 4/33 |
| 2021/0005076 A1 | 1/2021 | Delgado et al. | |
| 2021/0037368 A1 | 2/2021 | Pellegrini et al. | |
| 2021/0037498 A1 | 2/2021 | Soma et al. | |
| 2021/0048829 A1 | 2/2021 | Deyle et al. | |
| 2021/0090733 A1* | 3/2021 | Dibari | G16H 15/00 |
| 2021/0142632 A1 | 5/2021 | Blaser | |
| 2021/0239823 A1* | 8/2021 | VanBlon | G01S 13/46 |
| 2021/0297380 A1* | 9/2021 | Hardy | H04L 51/222 |

* cited by examiner

600

| | |
|---|---|
| ADD LOCATION | |
| NAME | BREAK AREA |
| EMERGENCY ADDRESS (OPTIONAL) | 123 MAIN ST., PLEASANTVILLE, CA... |

| | |
|---|---|
| IP ADDRESS | PUBLIC IP (OPTIONAL) |
| | |
| | SUBNET/PRIVATE IP (OPTIONAL) |
| | 192.100.10.0/24 |

| | |
|---|---|
| NETWORK SWITCH (OPTIONAL) | MAC ADDRESS |
| | 12:34:AB:5CDE:6F |
| | PORT LABEL (OPTIONAL) |
| | BREAK-ROOM-FLOOR1 |
| | PORT RANGE (OPTIONAL) |
| | FROM 12  TO 16 |

| | |
|---|---|
| BSSID (OPTIONAL) | 98:7Z:65:43:2Y:X1 |
| ELIN | (123) 456-7890 |

FIG. 6

INTEGRATED EMERGENCY EVENT DETECTION AND MAPPING USING INDIVIDUALIZED DEVICE LOCATION REGISTRATIONS

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for integrated emergency event detection and mapping using individualized device location registrations.

One aspect of this disclosure is a method, which includes registering one or more first locations for a number of first devices registered with a software platform and located at a premises associated with the software platform and also registering one or more second locations for a number of second devices registered with the software platform and located external to the premises. An emergency call placed from a device registered with the software platform while the device is at a registered location is detected. Information associated with the registered location of the device is then signaled to a public safety answering point to which the emergency call is routed.

Another aspect of this disclosure is a method, which includes detecting, at a first time, a first network device through which a device registered with a software platform connects to access a network at a premises associated with a software platform, prompting an operator of the software platform to identify, a location of the device within the premises as a first location, and generating a first record for the device indicating the first location and information associated with the first network device. At a second time, a second network device through which the device connects to access a network at a location external to the premises is detected, the operator is prompted to identify, as a second location, the location external to the premises, and a second record for the device indicating the second location and information associated with the second network device is generated. Responsive to detecting, at a third time, that an emergency call is placed from the device, a current location of the device is determined using the first record or the second record. Information associated with the current location of the device is then signaled to a public safety answering point to which the emergency call is routed.

Yet another aspect of this disclosure is a method, which, responsive to detecting that an emergency call is placed from a device registered with a software platform, includes identifying a network device to which the device is connected to access a network. A location of the device is determined by searching records of the software platform based on information associated with the network device. Information associated with the location of the device is then signaled to a public safety answering point to which the emergency call is routed.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is an illustration of an example user interface for collecting device location information.

DETAILED DESCRIPTION

Figure 1:
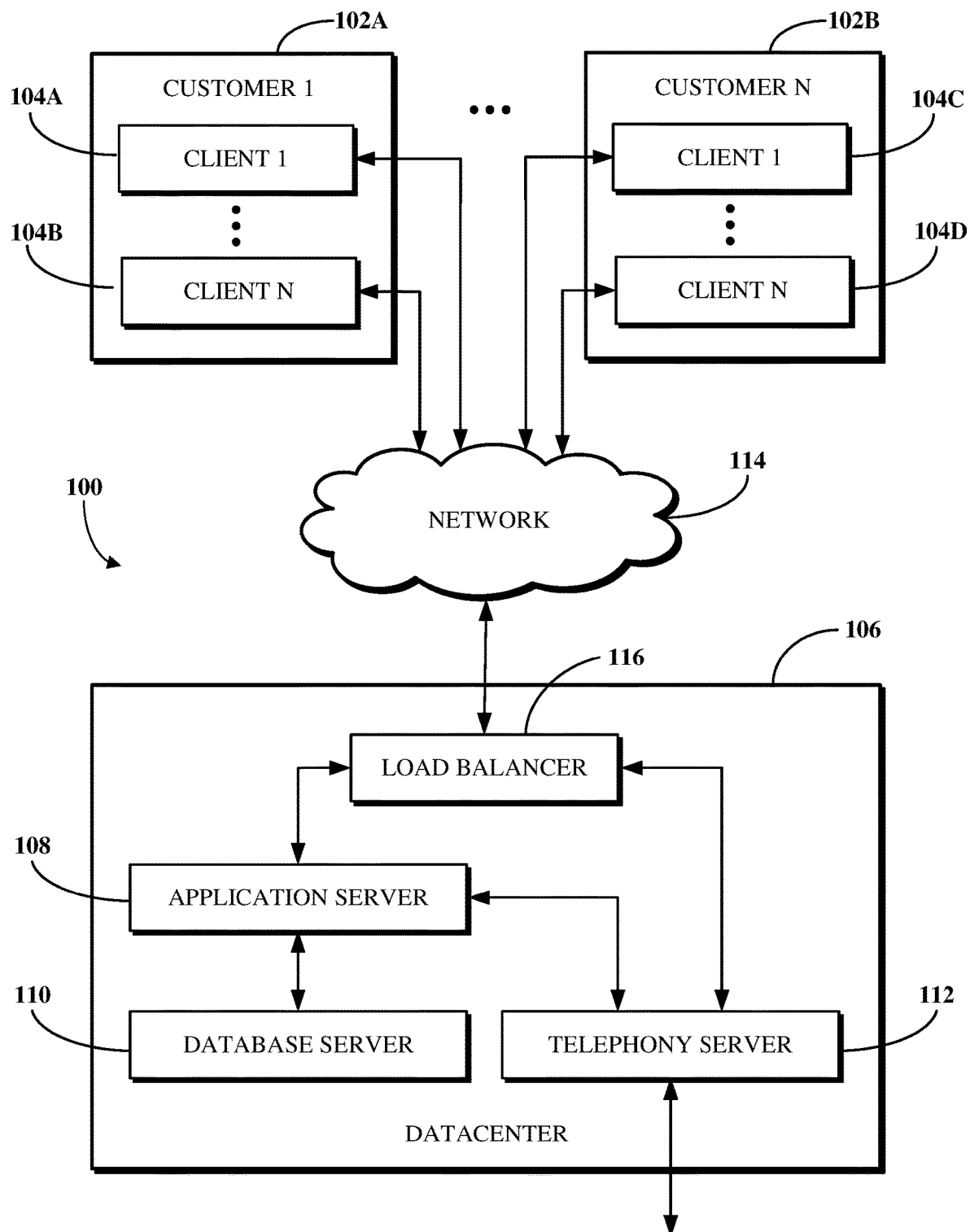
FIG. 1 is a block diagram of an example of an electronic computing and communications system.

In an emergency event, it is imperative that on-site personnel be given as much early notice as possible as to the event to enable them to get to safety or otherwise act. For example, the emergency event may be one or more of a fire, a flood, a hazardous material spill, a contamination of breathable or consumable matter, a carbon monoxide danger, an active shooter, a bomb threat, a terrorist attack, a medical episode, or another event for which emergency response is sought. Generally, at least one person at the location of an emergency event will place an emergency call to indicate the emergency event to a public safety answering point (PSAP), which can then work with local authorities to dispatch an appropriate emergency response team. In an office setting, older telephony systems may not have enhanced emergency call (e.g., E911) services enabled or otherwise be compliant with relevant laws, such as which require that specific location information be signaled directly to a PSAP.

Furthermore, although a typical premises has some alert mechanism in place, that mechanism is generally not configured for various types of emergency events, and it may fail to adequately notify personnel as to an event if the personnel mistake an alert to be a test or otherwise not an active threat. For example, a fire should be alerted differently than an active shooter, given that personnel should attempt to exit the premises as quickly as possible in a fire whereas they should instead remain locked down in place where an active shooter is present.

One solution to both of these problems may include a designated office administrator being given the option to identify certain areas within a premises to automate the identification of a location of an emergency caller based on a network connection through the calling device, for example, based on an IP address, a subnet range, or a MAC address of a network device known to be located in a certain place in the premises. For example, a defined understanding of where a given network device is located and which other devices connect to it can give a good understanding of where those other devices are located. However, in most cases, typical office administrator either will not familiar with such network device information or otherwise may not have visibility into these to identify the necessary information.

It is imperative that correct information for identifying a location of an emergency event be signaled to a PSAP. For example, the failure to accurately identify the location of an emergency event may delay dispatched responders in arriving at the correct location and thus hinder their ability to effectively respond to the emergency event. Furthermore, in some cases, information beyond the location of the emergency event may be needed for the dispatched responders to access that location. For example, the difference between first responders saving a person experiencing a critical medical episode and that person succumbing thereto might depend on whether the responders used the most efficient path to access the emergency event location and/or having a security code to enter through a locked door at the location. However, the reliance upon users to manually signal this information can create a risk where those users are for some reason unavailable or unreachable.

Implementations of this disclosure address problems such as these using emergency event processing functionality of a software platform, such as a UCaaS platform. The emergency event processing disclosed herein includes call path processing functionality for concurrently routing an emergency call from a device registered with the software platform for a customer thereof to a PSAP and to a monitoring device of the customer. The concurrent routing enables an operator of the monitoring device to join the emergency call, for example, by monitoring the call to determine how to notify other operators of the customer of the subject emergency event or by joining the call to assist in the emergency event response. The concurrent routing may further automate, and therefore expedite, the signaling of an emergency event to others at the location of the emergency event, such as to prevent further risk of harm.

The emergency event processing disclosed herein further includes location mapping functionality for building a set of information associated locations of devices registered with the software platform. Operators of the devices may be prompted to input or verify location information for the devices, which in at least some cases may be determined based on network devices through which the devices connect to access a network. The location information may be one or more of a street address, building identifier, floor identifier, suite identifier, or room identifier. When an emergency call is from a device registered with the software platform, the software platform uses the map of locations to determine a location of the device and signals that location to a PSAP to which the emergency call is routed. The automated signaling of the mapped location information can improve an emergency response by directing dispatched responders to a specific location.

The emergency event processing disclosed herein further includes individualized device location registration functionality for allowing operators of the software platform to register one or more locations for each of their devices. Rather than limiting device location registration to a premises of a customer of the software platform or by a customer administrator, individual operators are prompted to register locations within the premises or external thereto, such as at private residences or businesses. Information associated with the operator-entered location information is stored alongside network device information. When an emergency call is from a device registered with the software platform, the software platform identifies network device information for the device placing the emergency call and searches records generated based on the operator-indicated device locations. A location determined thereby is then signaled to a PSAP. This automated signaling can improve an emergency response by directing dispatched responders to a specific location verified by the operator of the device, rather than an assumed location specified by an administrator which may not actually be accurate.

To describe some implementations in greater detail, reference is first made to examples of hardware and software structures used to implement a system for integrated emergency event detection and mapping including concurrent emergency call routing. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
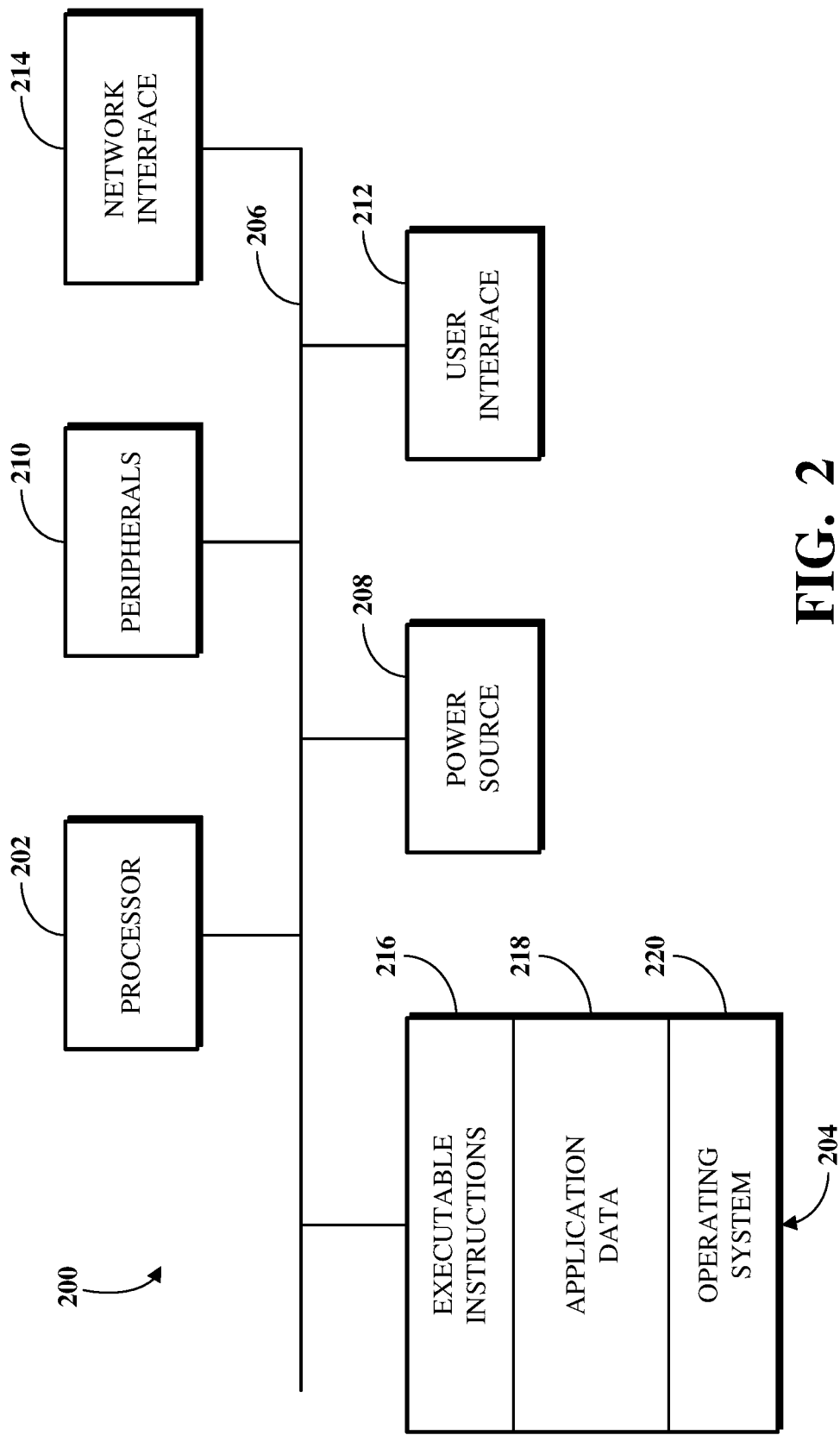
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
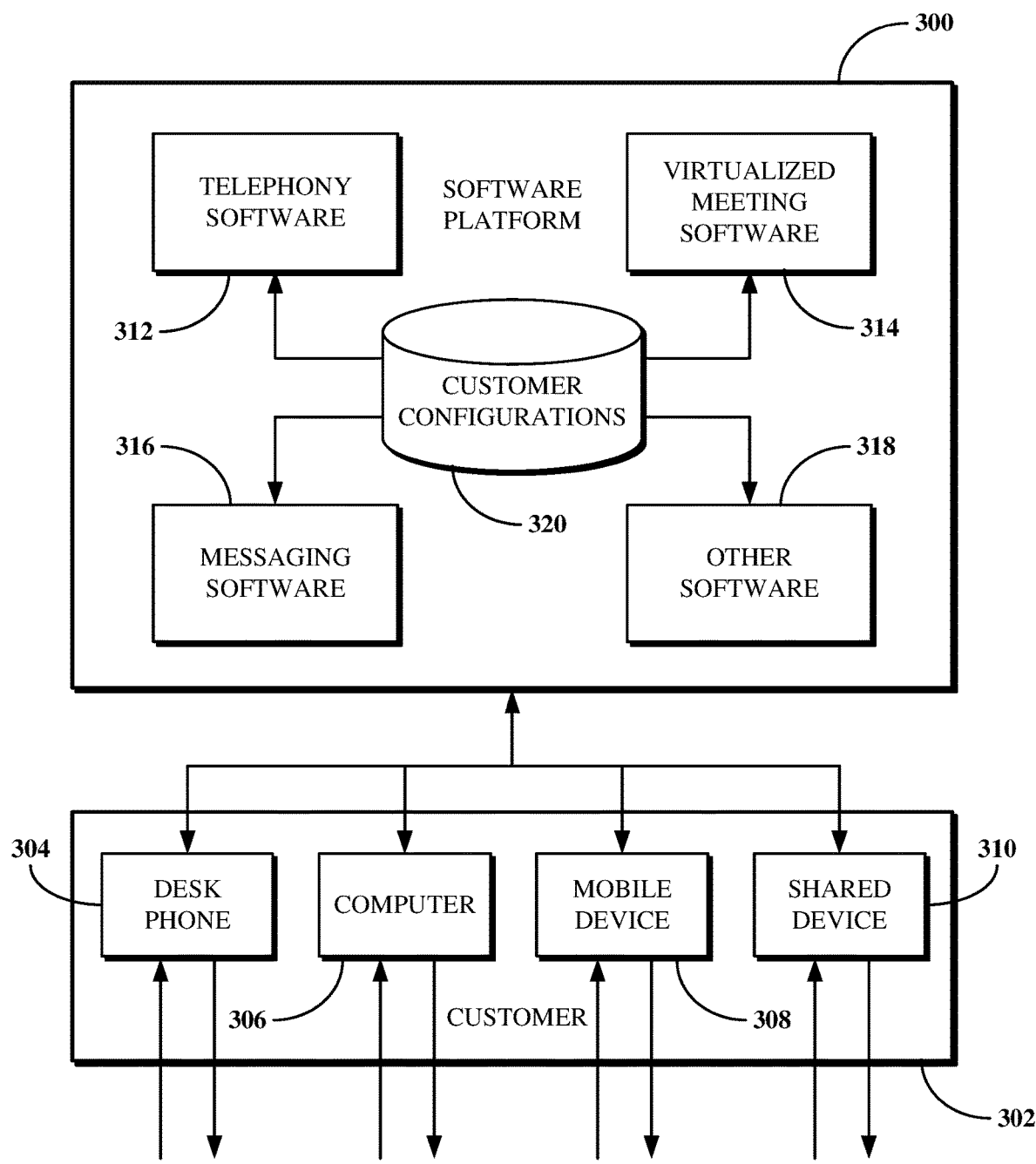
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single operator. The shared device 312 is a desk phone, a computer, a mobile device, or a different device which may instead be configured for use by multiple specified or unspecified operators.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the operators of those devices. The virtualized meeting software 314 can include functionality for hosting, presenting, scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between operators of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include emergency event software for detecting and mapping emergency events. For example, the emergency event software may include functionality for distributing an indication of an emergency event to one or more operators of a customer, such as operators of some or all of the clients 304 through 310. In at least some cases, the emergency event software can indicate within a pre-defined map of a premises a location of the emergency event, for example, to alert persons already present at the premises and/or first responders.

Features of the software services of the software platform 300 may be integrated with one another to provide a unified experience for operators. For example, the messaging software 316 may include a user interface element configured to initiate a call with another operator of the customer 302. In another example, the telephony software 312 may include functionality for elevating a telephone call to a virtualized meeting. In yet another example, the virtualized meeting software 314 may include functionality for sending and receiving instant messages between participants and/or other operators of the customer 302. In yet another example, the virtualized meeting software 314 may include functionality for file sharing between participants and/or other operators of the customer 302. In some implementations, some or all of the software 312 through 318 may be combined into a single software application run on clients of the customer, such as one or more of the clients 304-310.

Figure 4:
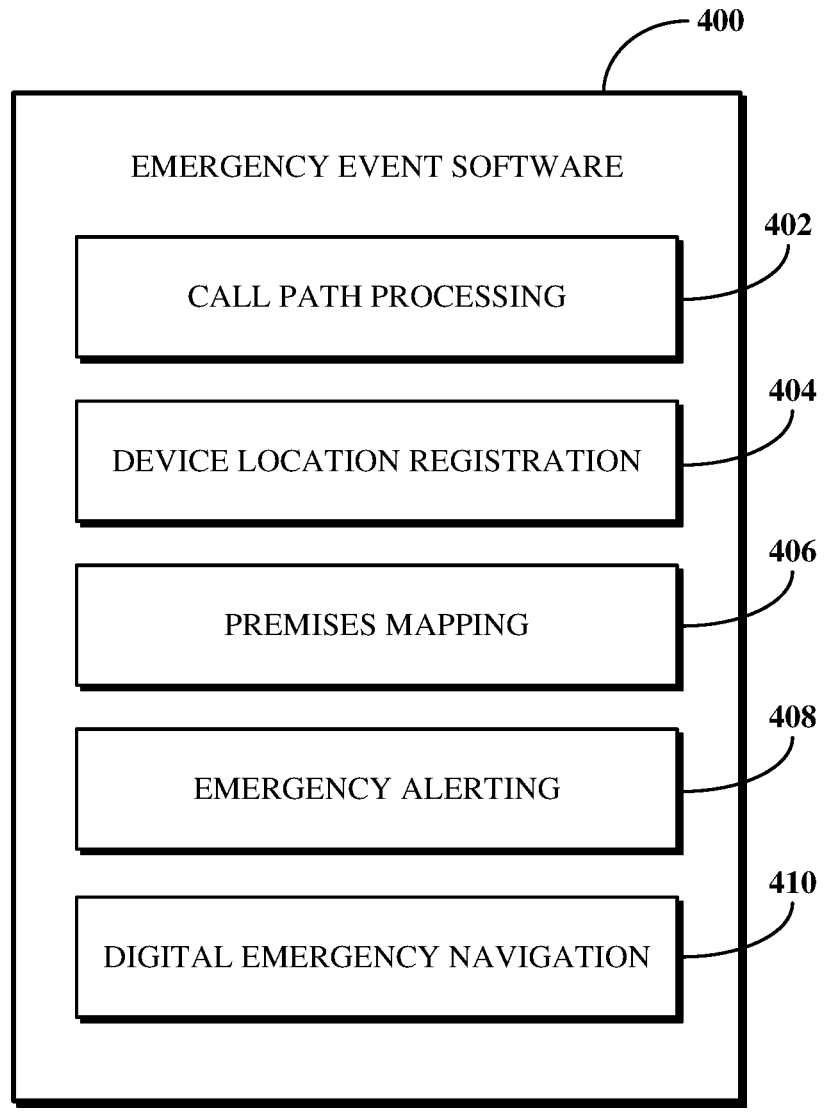
FIG. 4 is a block diagram showing example functionality of emergency event software of a software platform.

FIG. 4 is a block diagram showing example functionality of emergency event software 400 of a software platform, which may, for example, be the software platform 300 shown in FIG. 3. For example, the emergency event software 400 may be the emergency event software described above with respect to the other software 318. The emergency event software 400 includes tools for detecting and mapping emergency events, as well as for performing other functionality related to emergency event processing. As shown, the emergency event software 400 includes a call path processing tool 402, a device location registration tool 404, a premises mapping tool 406, an emergency alerting tool 408, and a digital emergency navigation tool 410.

When an operator (e.g., a human user, a software intelligence unit, or another entity configured for client and/or device operation) of a device associated with a customer makes an emergency call using a device registered to the software platform, the call path processing tool 402 operates to route the emergency call to a destination, such as a public safety access point (PSAP) which includes representatives who field emergency (e.g., 911, 111, etc.) calls and dispatches emergency responders to the locations of subject emergency events. However, the call path processing tool 402 concurrently routes the emergency call to a monitoring device of the customer of the software platform to enable an operator of the monitoring device to join the emergency call. In particular, the call path processing tool 402 detects when a device registered to the software platform for an operator of the software platform places an emergency call over a VOIP connection and concurrently routes the emergency call to both the PSAP and the monitoring device. The monitoring device is a network-enabled device of the customer registered to the software platform which is configured to receive information about emergency calls placed by other devices registered to the software platform and to join or monitor those emergency calls. For example, the monitoring device may be a client such as any of the clients 304 through 310 shown in FIG. 3.

The device location registration tool 404 prompts operators of devices registered to the software platform to verify locations of those devices. A device registered for a customer of a software platform may be located in a premises of the customer, may be located external to the premises, or may be mobile and movable between a location within the premises and a location external to the premises. The device location registration tool 404 thus is configured to register one or more locations for each device of a customer of the software platform. The device location registration tool 404 may prompt the operator of a device to input the location of the device. Alternatively, the device location registration tool 404 may prompt the operator to verify the location of the device. For example, in some implementations, the device location registration tool 404 may identify a presumed location by querying a geolocation service (e.g., a global positioning system (GPS) service or like service) using the presumed location. The presumed location may, for example, refer to one or more of a street address, a latitude and longitude coordinate set, or another location identifier. In some implementations, the device location registration tool 404 may be part of software other than the emergency event software 400. For example, the device location registration tool 404 can represent a software tool used to initialize a customer account or portion thereof with the software platform.

The premises mapping tool 406 enables a customer of the software platform to automatically or manually map out a premises of the customer. A premises may be or include one or more buildings, floors, suites, rooms, or other identifiable regions. For example, a premises for one customer of the software platform may consist entirely of a single office suite on a single floor, whereas a premises for another customer of the software platform may consist of multiple entire buildings each with one or more floors, in which each floor of each building has one or more rooms. The map of the premises may be manually generated by an operator of the customer, for example, using map or image rendering software. Alternatively, the map of the premises may be generated automatically using the premises mapping tool 406 in one or more ways. In one such way, the map can be generated using information associated with network devices located at the premises to understand which the parts of the premises at which those network devices are located; however, this approach may not result in a spatial map, but more of a mapping associating parts of the premises with certain devices that ultimately connect to those identified network devices. In another such way, the map can be generated using information output by one or more bootstrapped devices, which may traverse throughout a premises and provide indications of names of the parts of the premises as the one or more bootstrapped devices are located therein.

The emergency alerting tool 408 causes alerts indicative of emergency events to be transmitted to devices registered with the software platform for a customer. The emergency alerting tool 408 can be triggered automatically based on an emergency call from a device of the customer. For example, the emergency alerting tool 408 can use a chat bot to alert operators of the customer of the software platform as to an emergency event which has been detected. In another example, the emergency alerting tool 408 can use natural language processing to process a bitstream including a voice signal of the operator of the device from which the emergency call is placed. The results of that processing can be used to identify a type of emergency event and trigger an automated alert accordingly. Alternatively, the monitoring device to which the emergency call is concurrently routed along with the PSAP can be used to trigger the alert functionality of the emergency alerting tool 408. For example, an operator of the monitoring device can indicate an emergency event type based on information signaled within the bitstream of the emergency call and/or based on information verbally communicated as part of the emergency call. Ultimately, one or more devices of a customer can be used to output a message indicative of the alert, for example, to warn users of those devices and other people as to the emergency event.

The digital emergency navigation tool 410 outputs information usable to identify a location of an emergency event. For example, the digital emergency navigation tool 410 can cause a map of a premises of a customer of the software platform to indicate a location of an emergency event at the premises. In another example, the digital emergency navigation tool 410 can cause a map of the premises of the customer, with or without the indication of the location of the emergency event threat, to be displayed at a digital signage display in or external to the premises. In such a case, the digital signage display can be leveraged to direct first responders to the scene of an emergency event, indicate areas of a premises affected by an emergency to company personnel, or for other purposes. In yet another example, the digital emergency navigation tool 410 can transmit the location of the emergency event, whether in the premises or external to the premises, to one or more devices registered with the software platform and/or to one or more devices of first responders who are dispatched to respond to the emergency event.

In some implementations, the emergency event software 400 may include one or more administrative features for monitoring operations performed and/or data used by the emergency event software 400. For example, an administrative feature of the emergency event software 400 can show where operators are at a given time (e.g., within a premises or external to the premises, for example, at a registered location outside of the premises, such as a personal home), whether those operators have enabled emergency tracking functionality to identify locations of devices of those operators in the event those devices are used to place an emergency call, review and/or audit registered locations for some or all devices registered to the software platform for the customer, or the like.

Although the tools 402 through 410 are shown as functionality of the emergency event software 400 as a single piece of software, in some implementations, some or all of the tools 402 through 410 may exist outside of the emergency event software 400 and/or the software platform may exclude the emergency event software 400 while still including the tools 402 through 410 elsewhere.

The functionality of the emergency event software 400 as described throughout this disclosure may be used both by a customer of a software platform which uses the software platform for telephony services and thus has direct access to VOIP call features of the provider of the software platform and a customer of the software platform which uses a third party for telephony services which are peered with the software platform. In this way, enhanced emergency call (e.g., E911) functionality as is described herein may be enabled even with the latter, so-called legacy telephony systems.

Figure 5:
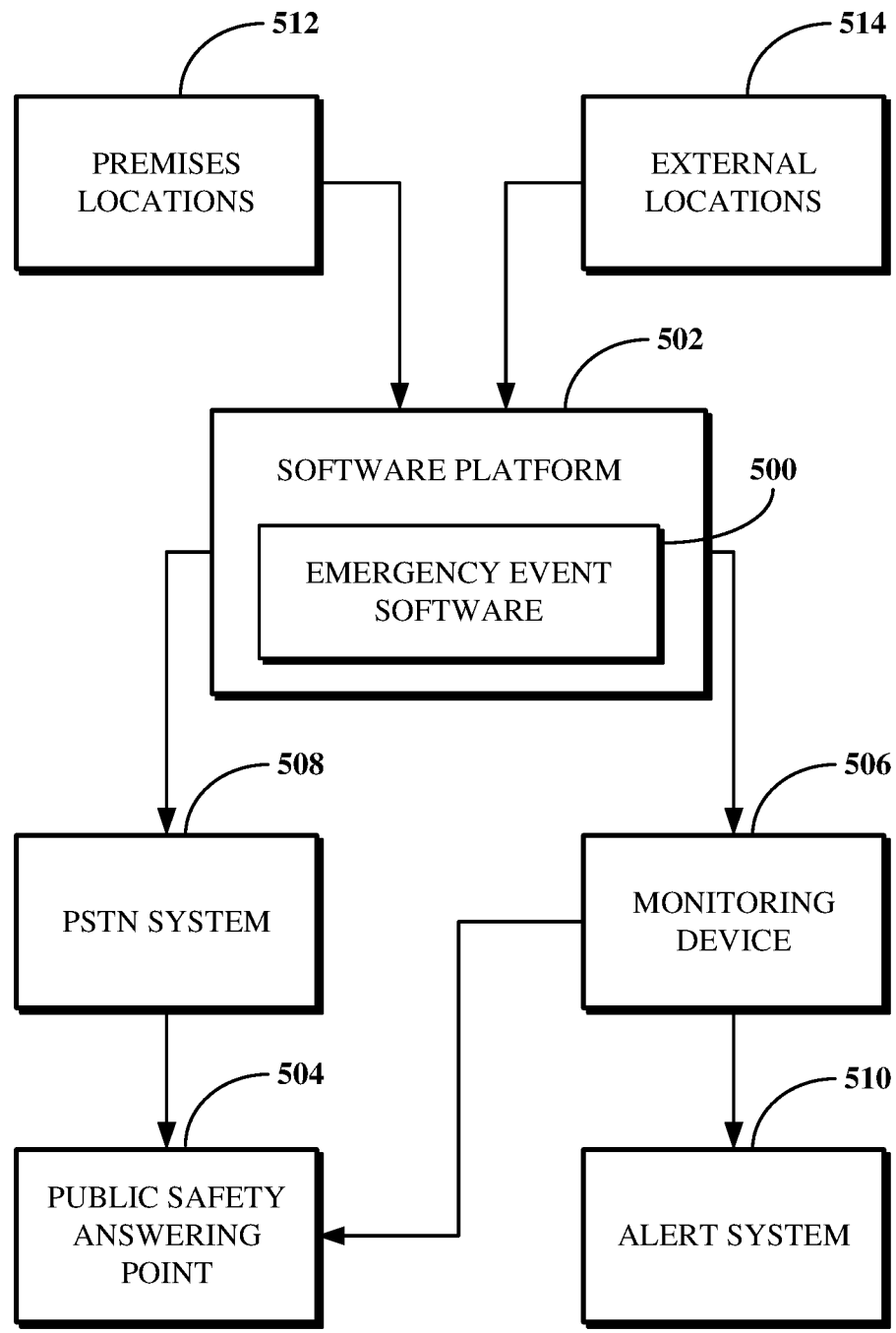
FIG. 5 is a block diagram of an example of call path processing used by emergency event software.

FIG. 5 is a block diagram of an example of call path processing used by emergency event software 500, which may, for example, be the emergency event software 400 shown in FIG. 4. Aspects of the call path processing described with respect to FIG. 5 may, for example, be performed by or using the call path processing tool 402 shown in FIG. 4.

The call path processing operates to concurrently route an emergency call from a device registered with a software platform 502, which may, for example, be the software platform 300 shown in FIG. 3, to a PSAP 504 and to a monitoring device 506. The call path processing thus creates two paths for an emergency call, in which, in a first path, the emergency call is routed through a PSTN system 508 to the PSAP 504 and, in a second path, the emergency call is routed to the monitoring device 506 which can then trigger functionality of an alert system 510 for operators of the software platform 502. The routing of the emergency call is concurrent by virtue of the routing of the emergency call to the PSAP 504 and the routing of the emergency call to the monitoring device 506 being at the same time or at substantially the same time. In particular, to perform the concurrent routing, a device connects with a telephony server of the software platform 502, which may, for example, be the telephony server 112 shown in FIG. 1, to initiate an emergency call. The telephony server then creates a first SIP invite for a first call to the PSAP 504 and a second SIP invite for a second call to the monitoring device 506. In some cases, the PSAP 504 may accept the first SIP invite before the monitoring device 506 accepts the second SIP invite. In some cases, the monitoring device 506 may accept the second SIP invite before the PSAP 504 accepts the first SIP invite. In either case, once both of the first SIP invite and the second SIP invite have been accepted, the first call and the second call are merged.

The emergency event software 500 detects an emergency call from a device registered with the software platform 502 and then determines a location of that device. For example, the software platform 502 may store records for premises locations 512 which are locations registered with the software platform 502 within a premises of a customer of the software platform and external locations 514 which are locations registered with the software platform 504 external to the premises of the customer. The emergency event software 500 identifies a record associated with the device from which the emergency call is placed and identifies, within the record, a location of the device. The emergency event software 500 then signals that location within the bitstream for the emergency call. The location of the emergency event is considered to be the location of the device from which the emergency call was placed at the time of the emergency call, unless indicated otherwise such as by the operator of that device.

The premises locations 512 and the external locations 514 may be defined by various operators of the customer of the software platform. The premises locations 512 can correspond to one or more of a street address of the premises, one or more buildings of the premises, one or more floors for each building, one or more suites for each floor, one or more offices for each suite, etc. The external locations 514 can correspond to one or more of a street address of the external location, a defined name for a personal residence (e.g., "Colin's house"), a business name, etc.

In an example scenario, an operator of a customer of the software platform 502, Colin, initiates an emergency call by calling 911 from his device, which is registered with the software platform 502. At call time, signaling information including information associated with a network device through which the device Colin uses is signaled to the software platform 502. The software platform 502, via the emergency event software 500, matches the location with a stored record and appends or embeds the emergency address to signal the location information to a telephony service provider of the customer. For example, if the telephone service provider, which may or may not be the same as the entity which operates the software platform 502, is capable of receiving presence information data format location object (PIDF-LO) signaling such that PIDF-LO is deemed enabled, the appended or embedded emergency address information may be signaled using a PIDF-LO tag; however, if the telephony service provider is not capable of receiving PIDF-LO signaling or if it is unclear whether the telephony service provider is capable of receiving PIDF-LO signaling, in either case such that PIDF-LO signaled is deemed not enabled, the appended or embedded emergency address information may be signaled by using an emergency location identification number (ELIN). The call is processed through the PSTN system 508 to the PSAP 504, which receives a signal including Colin's name, phone number, and location. Concurrently, the monitoring device 506 receives a signal including Colin's name, phone number, and location. An operator of the monitoring device 506 can use that signal to cause automated emergency indications to be communicated to personnel present at the location of the emergency event and/or others.

FIG. 6 is an illustration of an example user interface 600 for collecting device location information. The user interface 600 may, for example, be a user interface prompted to a user of a software platform, for example, the software platform 300 shown in FIG. 3, using a device location registration tool, for example, the device location registration tool 404 shown in FIG. 4.

The user interface 600 includes fields for collecting input or verifying information for registering a location of a device with the software platform. In the example shown, the information collected or presented for verification within the user interface 600 includes a location name (e.g., "Break Area"), an emergency address (e.g., a street address or other common address for a premises), and an ELIN (e.g., the number which will show on a caller ID when the device makes an outgoing call).

The information further includes optional information for collecting or presenting for verification within the user interface 600. The optional information generally relates to network information for the device and/or information associated with a network device through which the device connects to access a network. For example, the user interface 600 includes fields for: a public IP address and/or a subnet or private IP address of the device; a MAC address, port label, and/or port range of a network switch; and a basic service set identifier (B S SID) of a wireless access point.

In some cases, the user interface 600 may be empty when presented to an operator of the device. For example, the user interface 600 may be used to collect input used to generate a record for the device location with the software platform. In other cases, the user interface 600 may be partially or completely filled with information presented for verification to an operator of the customer of the software platform. For example, the device location registration tool 404 or another tool or software aspect of the software platform can determine a location of the device using one or more of a geolocation service or information associated with a network device (e.g., a BSSID) through which the device connects to access a network, for example, the network 114 shown in FIG. 1.

The locations at which a device may be registered using the user interface 600 may be within a premises of a customer of the software platform or external to the premises. As such, for a given device, the user interface 600 may be presented to an operator of the customer who uses that device for input or verification of the requested information. In this way, the software platform does not limit device location registration to office administrators or another small subset of personnel of the customer. Thus, some or all operators of a customer of the software platform may fill out or verify information within the user interface 600 for one or more devices and, in some cases, multiple times for a single device.

The software platform may present the user interface 600 at a device whenever the software platform detects that the device is at a location which is not registered with the software platform. For example, the software platform may collect a BSSID of a wireless access point or a MAC address of a network switch used by the device to connect to a network and query records of registered device locations using that collected information. A new record is generated for the new device location. The software platform includes, within that new record, an IP address of the device, the BSSID of the wireless access point or the MAC address of the network switch, and/or other network information for the device or a network device through which the device connects.

Figure 7:
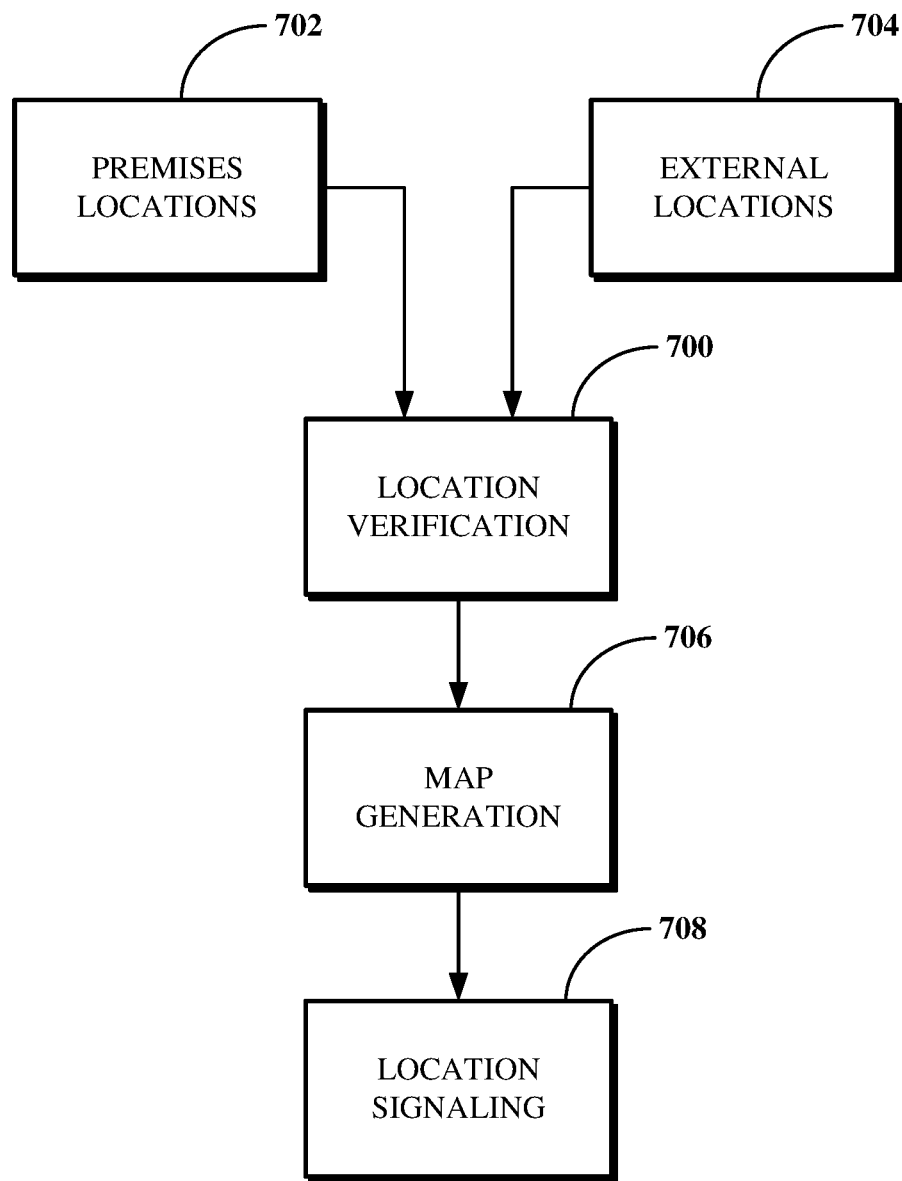
FIG. 7 is a block diagram of an example of mapping a premises to identify location information.

FIG. 7 is a block diagram of an example of mapping a premises to identify location information, which uses a location verification tool 700 based on one or both of premises locations 702 or external locations 704 input thereto, a map generation tool 706, and a location signaling tool 708. Aspects of the premises mapping described with respect to FIG. 7 may, for example, be performed by or using the premises mapping tool 406 shown in FIG. 4.

The premises mapping operates to generate a map of locations of devices of a customer of a software platform, for example, the software platform 300 shown in FIG. 3. In some implementations, the map of locations may be for locations within a premises of the customer only. In some implementations, the map of locations may include locations of devices both within the premises and external to the premises. The locations of the map of locations represent information usable to direct an emergency responder to a particular location, that is, the specific location at which a device which placed a subject emergency call is located.

The location verification tool prompts operators of the software platform to verify locations of one or more devices registered with the software platform. The location of a device may correspond to a premises location 702 or an external location 704. For example, the location of a device may be expressed as simply as by using a street address, in particular, for an external location 704 or where the premises location 702 is relatively small. In another example, the location of a device may be expressed using one or more of a building identifier, a floor identifier, a suite identifier, a room identifier, or the like, in particular, for a premises location 702 or where an external location is somewhere other than a private residence or merchant business. In some implementations, the location verification tool 700 may prompt some number of operators to walk around a premises of a customer and/or locations external to the premises and to keep confirming their address or other location to build up information usable to generate a map of locations.

In some implementations, a device used to collect or verify locations, such as the premises locations 702 and/or the external locations 704, may be an automated ranging device which moves around the subject locations, for example, without manual user intervention. For example, the automated ranging device may be a motorized robotic unit programmatically configured to navigate throughout some or all of the premises or an external location and to transmit indications of various locations throughout same.

The map generation tool 706 generates a map of locations using the output of the location verification tool 700, which namely includes verifications of addresses and/or other location information within a premises of the customer of the software platform or external to the premises. The map be a two-dimensional map, for example, as described below with respect to FIG. 9. Alternatively, the map may be a three-dimensional map, such as a point cloud or other three-dimensional model of one or more locations within and/or external to the premises. In some implementations, the map may include multiple two-dimensional maps and/or multiple three-dimensional maps, for example, to accommodate the use case where operators of the customer verified both premises locations 702 and external locations 704, where multiple premises are mapped, or where multiple external residences or businesses are mapped.

In some implementations, the map of locations may be a table or other data store usable to store location information and associated device information for later use by the software platform. For example, the customer of the software platform may maintain a database as the map of locations, in which the database associates verified locations within the premises and/or external to the premises with information associated with the devices registered at those locations and/or information associated with network devices through which those registered devices connect to access a network. In some such implementations, such a database may be used alongside a two-dimensional or three-dimensional map of locations such as to relate specific visually represented locations within or external to the premises with specific device information indicated in the database. In other such implementations, such a database may be used to later generate a two-dimensional or three-dimensional map of locations, as described above, for example, to visually represent locations of devices as indicated in the database.

The location signaling tool 708 uses the map of locations output by the map generation tool 706 to signal, within an emergency call from a device registered with the software platform, a location of that device as that location is expressed in the map of locations. For example, where the device is registered to "Colin's office, $4^{th}$ floor," the location signaling tool 708 can signal that specific information to the PSAP to which the emergency call is routed, along with the actual street address for the subject location, as is known to the software platform.

In some implementations, the location signaling tool 708 may not be considered to be part of the location mapping functionality of the software platform. For example, location signaling as described with respect to the location signaling tool 708 may be performed by another tool of emergency event software, for example, by the emergency alerting tool 408 of the emergency event software 400 shown in FIG. 4.

Figure 8:
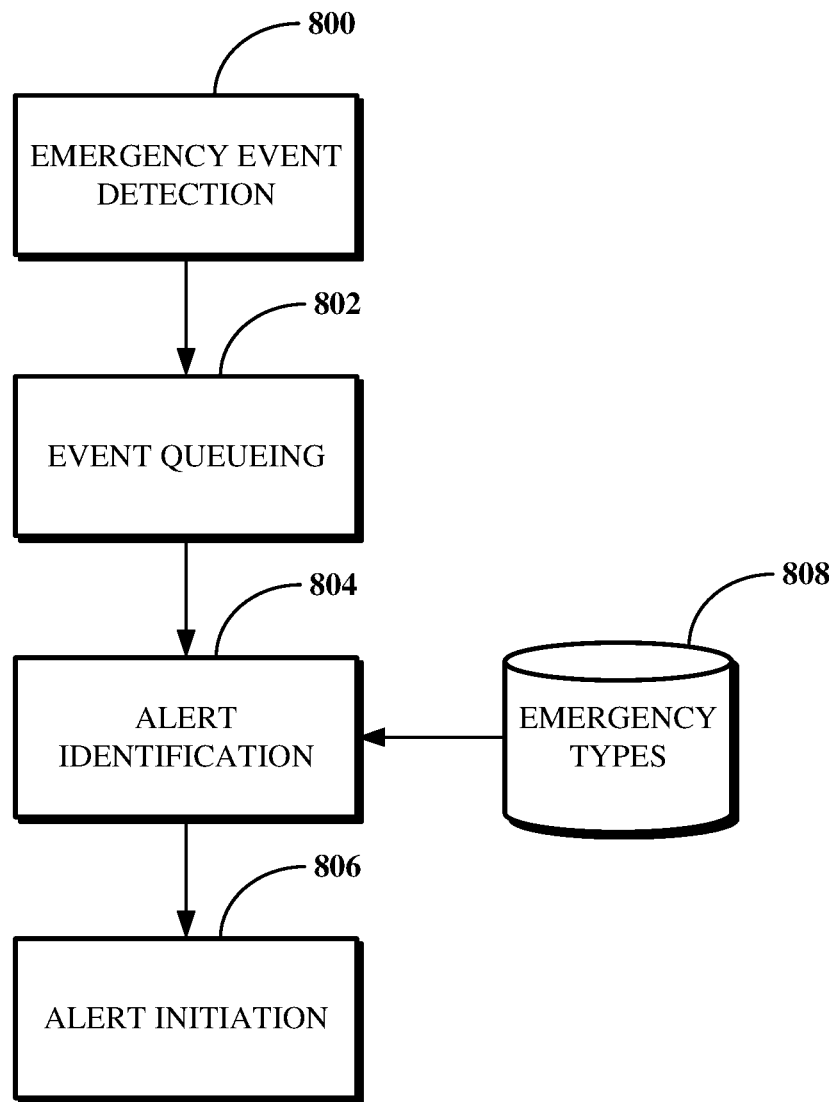
FIG. 8 is a block diagram of an example of emergency alert automation.

FIG. 8 is a block diagram of an example of emergency alert indication, which uses emergency event detection tool 800, event queueing tool 802, alert identification tool 804, and alert initiation tool 806 to cause an alert indicative of an emergency event to be transmitted to one or more devices registered with a software platform, for example, the software platform 300 shown in FIG. 3. For example, the tools 800 through 806 may be tools of an emergency alerting tool of the software platform, for example, the emergency alerting tool 408 shown in FIG. 4.

The emergency event detection tool 800 facilitates a detection of an emergency event at the software platform. An emergency event may be detected by an operator of a customer of the software platform placing an emergency call using a device registered with the software platform, by an automatic indication using an interface with an on-site emergency alert mechanism (e.g., a fire alarm, security system, etc.), or another indication. For example, because the software platform is configured to process VOIP calls, the software platform has visibility into phone numbers dialed by operators. Where a bitstream for a VOIP call indicates that the number dialed is for an emergency service (e.g., 911 in the United States), the software platform can process that VOIP call based on the number dialed to determine that an emergency event has been detected. In some implementations, where a number for an emergency service is dialed in error, the software platform may identify the call as a false positive and thus not detect an emergency event therefor.

The event queueing tool 802 queues detected emergency calls for further processing at the software platform. In particular, because emergency calls are concurrently routed by the software platform to a PSAP and to a monitoring device associated with the same customer of the software platform as the operator from whose device the emergency call is placed, the event queueing tool 802 operates to process emergency calls detected at the software platform in a queue such as by routing calls to available monitoring devices of the customer as the monitoring devices are available. A customer may, for example, have one or many monitoring devices for joining emergency calls. Where emergency calls are placed from multiple devices associated with the customer, those calls may be processed in a queue data structure (i.e., first in, first out). However, the software platform will not delay the routing of an emergency call to a PSAP if no monitoring devices are available to join the emergency call, such as if more emergency calls are simultaneously or substantially simultaneously placed than there are monitoring devices for the customer.

In some implementations, certain devices registered with the software platform may be given a higher priority for passing through the emergency call queue at the event queueing tool 802. For example, a device of an office administrator, a business owner, or another person identified as having a high level within the customer organization can have priority call access. In some such implementations, the event queueing tool 802 may use a hybrid queue/stack data structure by allowing emergency calls from priority devices to be processed first (e.g., last in, first out).

The alert identification tool 804 uses emergency types 808 defined for the customer of the software platform to determine the manner by which to notify operators of devices registered with the software platform for the customer as to the emergency event. The emergency types 808 may be defined by default, defined for the customer of the software platform, or both. Each, or at least some, of the emergency types 808 may be associated with different emergency event types. For example, an emergency event determined to be a fire at the premises may need to be alerted differently than an emergency event determined to be a medical event at the premises or at a location external to the premises. The emergency type 808 which most closely represents the emergency event which is the subject of a given emergency call is selected or otherwise identified by the alert identification tool 804.

The alert initiation tool 806 initiates the alert process by transmitting alerts indicative of the emergency event to one or more devices registered with the software platform for the customer according to the emergency type. For example, the alert initiation tool 806 may transmit a message for output by one or more software aspects of the software platform, such as one or more of the software 312 through 318 shown in FIG. 3. For example, team chat channels may receive an automated message indicating either that an emergency event is occurring or specifying a particular emergency event which is occurring. In another example, digital signage displays may be controlled to output indications of the emergency event. In yet another example, push notifications, calls, emails, instant messages, SMS messages, or other alerts may be communicated to other user devices registered with the software platform. Depending on the emergency type, all, or some but not all, devices registered for the customer may receive these alerts. For example, in some implementations, only devices located at the site of an emergency event may receive these alerts. In some implementations, the indication of the detected emergency event may also be communicated to one or more devices not registered with the platform, for example, devices of first responders.

In some implementations, the software platform may omit the emergency types 808. In such a case, an understanding of how to communicate the alert to devices registered for the customer of the software platform may be manually specified, for example, by an operator of a monitoring device to which the emergency call was concurrently routed. For example, the operator of the monitoring device may observe the emergency call and determine, based on verbal communications between the operator who dialed the emergency number and the PSAP representative, the nature of the emergency event. The operator of the monitoring device may then accordingly cause an alert to be signaled to so some or all registered devices.

Figure 9:
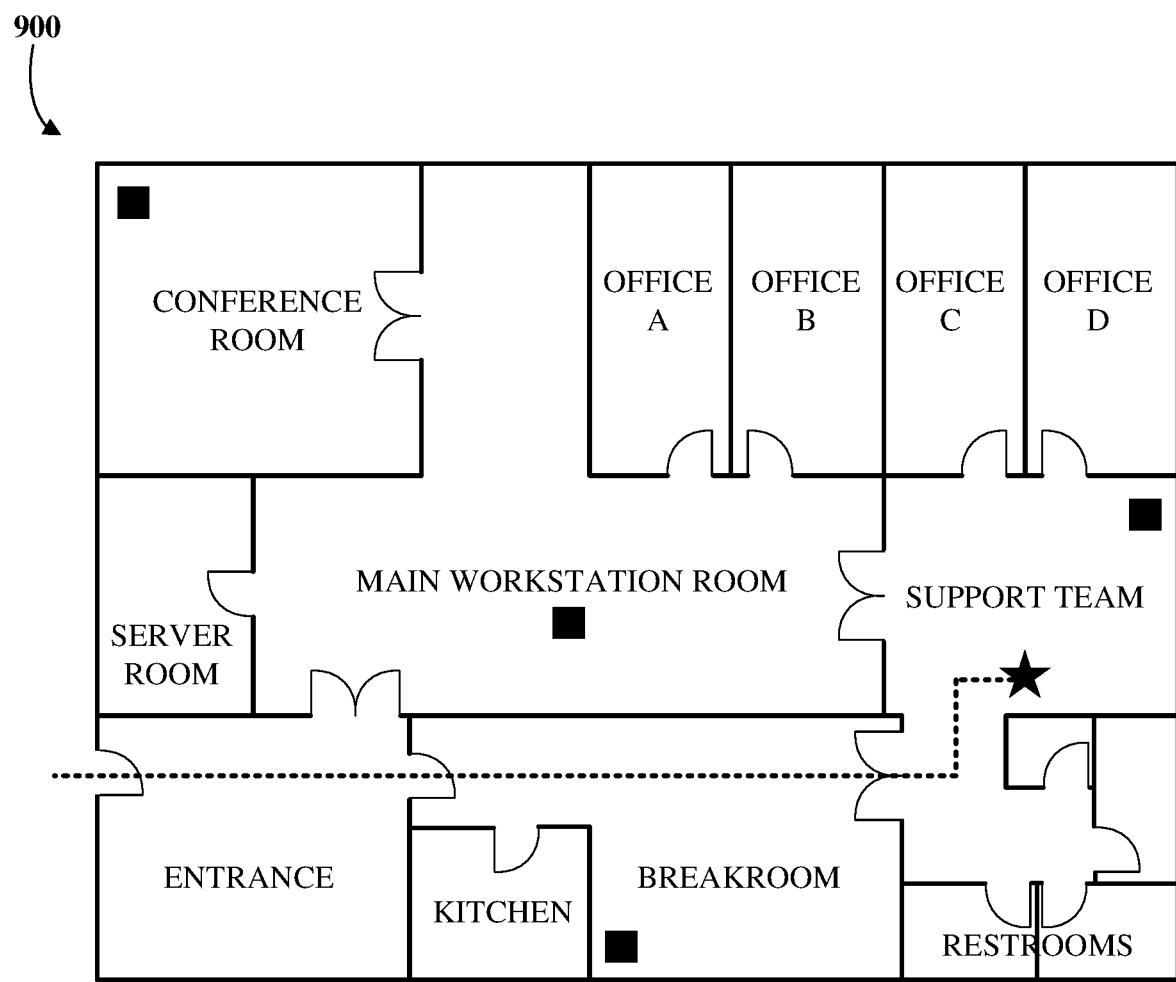
FIG. 9 is an illustration of an example of a digital emergency navigation map.

FIG. 9 is an illustration of an example of a digital emergency navigation map 900. The map 900 is a map of a premises and may be generated, received, or otherwise obtained by a software platform, for example, the software platform 300 shown in FIG. 3, for use with emergency event software, for example, the emergency event software 400 shown in FIG. 4. The map 900 shows a layout of a premises of a customer of the software platform. As shown, the premises includes a conference room, four offices, a server room, a kitchen, a breakroom, an entrance area, a main workspace room, a support room, restrooms, and some other small areas. The map may have been manually drawn by an operator of the software platform or automatically generated, for example, as described with respect to FIG. 7.

Network devices to which devices registered with the software platform are represented by squares in the map 900. A location of the emergency event at the premises is shown by the star in the map 900. A suggested path for accessing the location of the emergency event via an entry point to the premises is shown by the dotted line in the map 900. One or both of the location of the emergency event or the suggested path for accessing the location of the emergency event may be represented directly within the map 900, such as by altering the image of the map 900 itself. Alternatively, one or both of the location of the emergency event or the suggested path for accessing the location of the emergency event may be represented indirectly within the map 900, such as by layering one or more annotations onto the map 900 to visually indicate such information without actually altering the map 900 itself.

Figure 10:
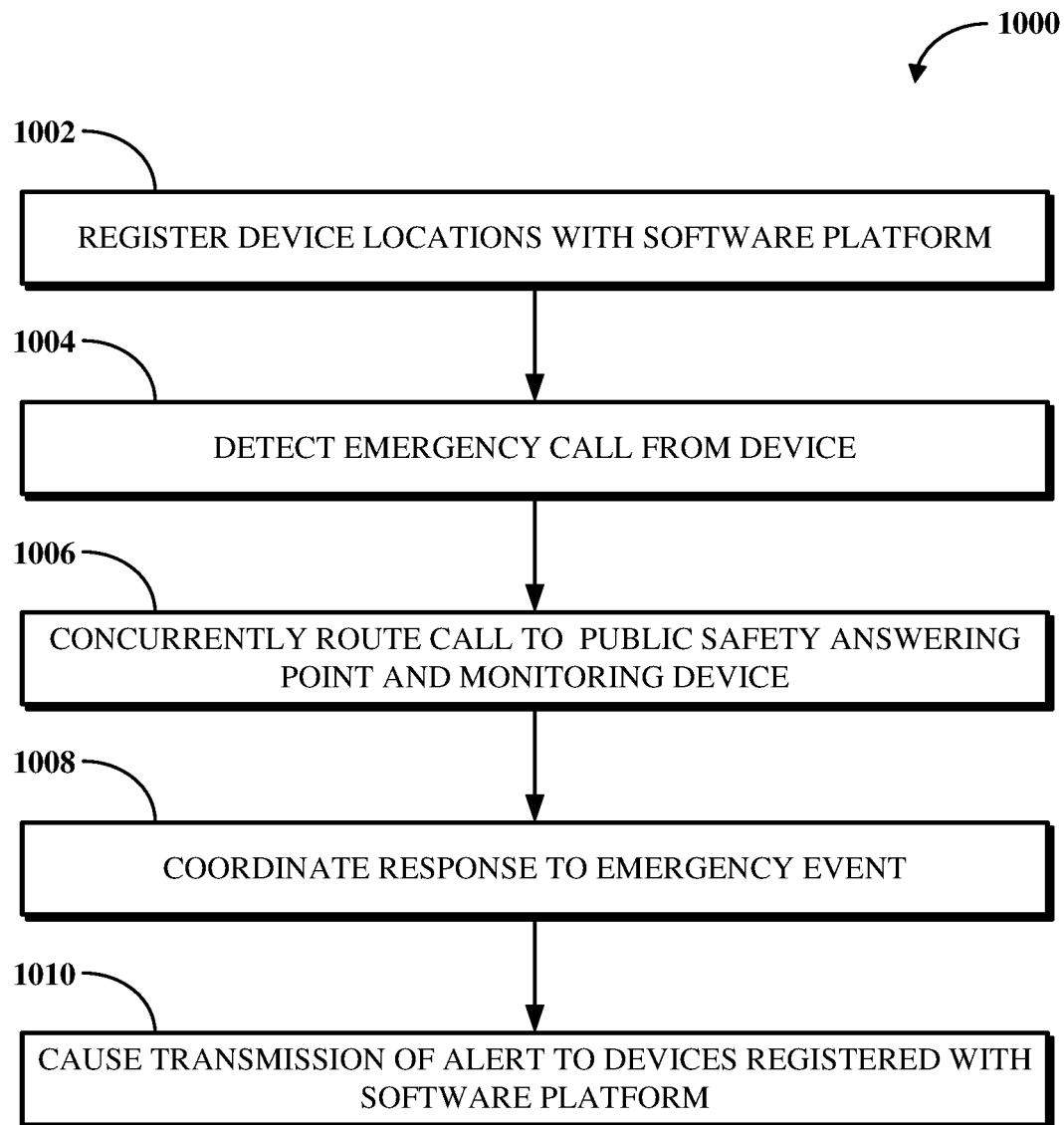
FIG. 10 is a flowchart of an example of a technique for detecting and responding to an emergency event.
Figure 11:
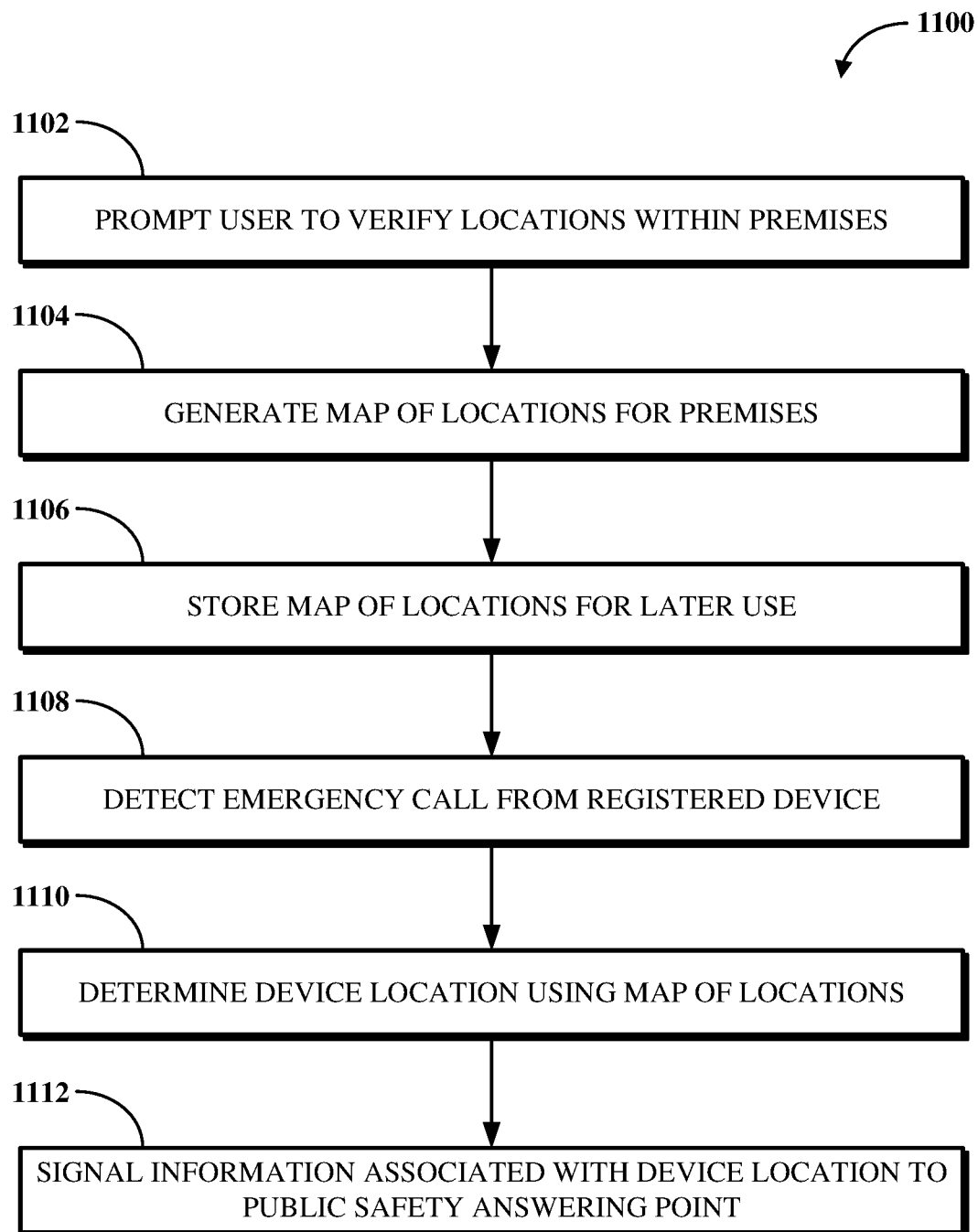
FIG. 11 is a flowchart of an example of a technique for mapping a premises for identifying location information for emergency events.
Figure 12:
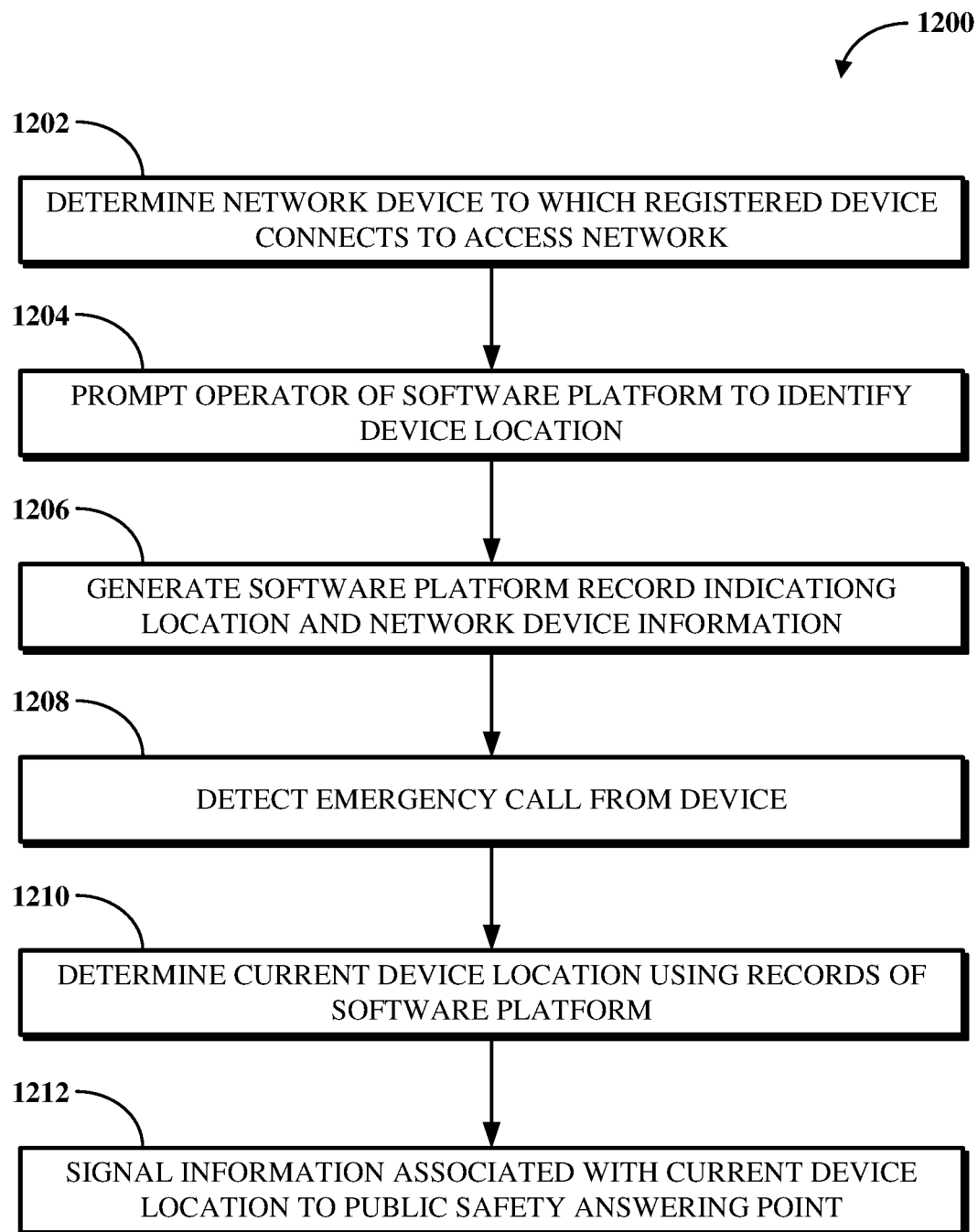
FIG. 12 is a flowchart of an example of a technique for determining location information for devices registered with a software platform.

To further describe some implementations in greater detail, reference is next made to examples of techniques which may be performed by or using a system for integrated emergency event detection and mapping including concurrent emergency call routing. FIG. 10 is a flowchart of an example of a technique 1000 for detecting and responding to an emergency event. FIG. 11 is a flowchart of an example of a technique 1100 for identifying location information for emergency events. FIG. 12 is a flowchart of an example of a technique 1200 for determining location information for devices registered with a software platform.

The techniques 1000, 1100, and 1200 can be executed using computing devices, such as the systems, hardware, and software described with respect to FIGS. 1-9. The techniques 1000, 1100, and 1200 can be performed, for example, by executing a machine-readable program or other computer-executable instructions, such as routines, instructions, programs, or other code. The steps, or operations, of the technique 1000, 1100, or 1200, or of another technique, method, process, or algorithm described in connection with the implementations disclosed herein, can be implemented directly in hardware, firmware, software executed by hardware, circuitry, or a combination thereof.

For simplicity of explanation, each of the techniques 1000, 1100, and 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 10, a flowchart of an example of the technique 1000 for detecting and responding to an emergency event is shown. At 1002, device locations are registered with a software platform, for example, a UCaaS platform. The device locations each refer to a location within a premises of a customer of the software platform or a location external to the premises. The device locations may be registered using information collected from or verified by individual device operators of the customer. In some cases, multiple registrations may be recorded for a single device where that device is used at multiple locations within the premises but no external locations, within the premises at multiple locations and at one or more external locations, within the premises at a single location and at one or more external locations, or at multiple external locations but no locations within the premises.

At 1004, the software platform detects an emergency call from a device registered with the software platform. The software platform includes a telephony server for processing VOIP calls from registered devices. The software platform thus receives bitstreams for the calls and can parse them to determine whether a call is an emergency call. The device may, for example, be a first device located at a premises of a customer of the software platform or a second device located external to the premises. The software platform is configured to detect emergency calls from devices registered with the software platform regardless of whether the devices are located at the premises.

In some implementations, the emergency call may be automated over the software platform responsive to a detection of the emergency event using one or more sensors located at the premises. For example, a sensor used to automatically detect the emergency event can be or include a smoke detector, a heat sensor, a water or moisture sensor, a carbon monoxide sensor, a pressure sensor, a door or window sensor, a metal detector, or another sensor configured for emergency event detection. In some such implementations, the sensor may be connected to a telephony line for the customer associated with the premises. The software platform may further be configured to cause that telephony line to automatically send an emergency call to a PSAP upon some sensor value being measured.

At 1006, the software platform concurrently routes the emergency call to a PSAP and to a monitoring device of a customer of the software platform. Because the emergency call is made over a VOIP system, the software platform is able to route the emergency call to multiple destinations. In particular, the emergency call is routed to the PSAP which is the intended recipient of the emergency call based on the location of the device which placed the emergency call. However, the software platform at the same or substantially the same time also routes the emergency call to the monitoring device. The routing to the monitoring device enables an operator of the monitoring device to join the emergency call. Joining the emergency call can include participating in the emergency call, such as by being part of the conversation of the emergency call, and/or monitoring the emergency call, such as to listen in on the conversation between the operator of the device and the PSAP representative to obtain information related to the emergency call without actively participating therein. For example, the monitoring device can join the emergency call by a new SIP transaction being formed with the monitoring device to convert the emergency call from a two-way call between the device that placed the call and a device at the PSAP to a three-way call including the monitoring device, as well. For example, converting the emergency call may include merging a first call between the device from which the emergency call is received and the PSAP and a second call between the device and the monitoring device. Once the monitoring device has joined the emergency call, the operator of the monitoring device may choose to participate in the emergency call by speaking to one or more other participants of the emergency call or to instead monitor the emergency call by listening to the other participants speak to one another.

Concurrently routing the emergency call to the monitoring device and to the PSAP includes signaling, by the software platform, a location of the device which placed the emergency call within a bitstream that is concurrently routed to the monitoring device and to the PSAP. For example, signaling the location of the device can include appending data representative of the location of the device to a bitstream of the emergency call or embedding such data within such a bitstream. Signaling the location of the device enables an efficient and effective deployment of emergency response resources to the actual location of the emergency event.

For example, the software platform may store records of registered locations of the devices registered to the software platform. A record of a registered location of a device may, for example, include at least a street address and network information usable to identify one or both of the device or a network device through which the device connects to access a network. Responsive to detecting the emergency call, the software platform may search through these records to identify a location of the current device. The software platform may then transmit the registered location included in a record of the device to the PSAP. In some implementations, the software platform may determine a current location of the device and compare it to locations within the software platform records. The software platform may then signal the location of the device responsive to a determination that the location of the device at a time of the emergency call matches a record.

The software platform concurrently routes all of the emergency calls placed from the devices to the monitoring device and one or more PSAPs including the PSAP. For example, different PSAPs may be alerted depending on the locations of the devices from which multiple emergency calls are made. However, in some implementations, a computing aspect other than the software platform may cause some or all of the concurrent routing. For example, the device from which the emergency call is placed may signal to the software platform to concurrently route the emergency call. When the software platform may then process that signal to determine to concurrently route the call to the monitoring device and to the PSAP. For example, the signal may be or include a syntax element integrated within a bitstream for the emergency call.

At 1008, a response to the emergency event which is the subject of the emergency call is coordinated. Because the operator of the monitoring device has joined the emergency call, the operator of the monitoring device may select to engage with a representative of the PSAP to assist in the response to the emergency event. For example, the operator of the monitoring device may have greater knowledge of the premises then the operator of the device from which the emergency call was placed. This greater knowledge could potentially assist emergency responders in more quickly or otherwise more efficiently accessing the location of the emergency event or otherwise addressing the emergency event. In some implementations, the operator of the monitoring device may not participate in the emergency call and may instead monitor the call.

At 1010, an alert indicating the emergency event is transmitted to one or more devices registered with the software platform. The one or more devices may, for example, include desktop phones, mobile devices, computers, shared devices, or the like. Regardless of whether the operator of the monitoring device actively participates in the emergency call, the operator of the monitoring device may cause an alert indicating the emergency event to be transmitted. The alert may be transmitted based on information associated with the emergency event as may be signaled within the bitstream for the emergency call routed to the monitoring device and/or indicated verbally by the operator of the device or a PSAP representative during the emergency call. For example, the operator of the monitoring device may determine a manner by which to indicate the emergency event to some or all operators associated with the customer of the software platform based on that information. For example, the monitoring device can be used to initiate an alert process with the software platform to cause the transmission of the alert. The software platform thus causes the transmission of the alert as described.

In some implementations, at least some of the devices to which the alert is transmitted runs software of the software platform. For example, the software may include one or more of a chat application, a video meeting application, a phone call application, or a shared virtual workspace application. As such, the transmission of the alert to the one or more devices may cause software of the software platform to output a message representing the alert. For example, some of the devices may be computers upon which a pop up prompt may be output to display the message, or which may receive a chat notification including the message.

In some implementations, the transmission of the alert may be according to an emergency type for the software platform indicating the manner by which to notify operators associated with the customer of the software platform. For example, the emergency type may be one or more emergency types defined at the software platform. Each of the emergency types may be associated with a different type of emergency event (e.g., fire, flood, hazardous material spill, active shooter, etc.). The correct emergency type to use for the emergency call placed by the device may be identified using the information associated with the emergency event.

In some implementations, the one or more devices to which the alert is transmitted may include at least one digital signage display configured to output a message representing the alert. For example, a digital signage display may be located within the premises of the customer of the software platform or external to those premises. In some cases, the digital signage display may be a display located in a common area of a building shared by the customer of the software platform and one or more other entities. In some such implementations, the message output by the at least one digital signage display may include a map indicating a location of the emergency event at the premises. For example, the map may be a digital map representing the premises, within which a location of the emergency event, as detected by the software platform, may be indicated such as using one or more annotations to the digital map.

In some implementations, the one or more devices to which the alert is transmitted may include an audio output device, for example, a speaker. For example, the audio output device can receive data representative of the alert and output a broadcasted audio message indicative of the emergency event. The audio output device may be located within the premises of the customer of the software platform or external to those premises. In some such implementations, the broadcasted audio message may include an indication of the location of the emergency event, for example, to warn anyone within listening distance to avoid that location or for anyone stuck in that location to behave in a certain way.

Referring next to FIG. 11, a flowchart of an example of the technique 1100 for identifying location information for emergency events is shown. At 1102, operators of devices registered to a software platform are prompted to verify locations of those devices within a premises of a customer of the software platform. An operator of a device may, for example, receive a request to verify a location of the device within the premises during the process of registering the device with the software platform. Alternatively, an operator of a device may move the device throughout the premises to one or more locations therein and verify each location in the premises as it is moved. For example, an operator may walk into one or more rooms of a premises and then indicate to generate a new data point for each of those one or more rooms.

In some implementations, a location prompted for verification to an operator of a device may be determined based on information associated with a network device through which the device connects to access a network. In some implementations, where the network device is unknown to the software platform, a record for the location within the premises may be updated to include the information associated with the newly detected network device.

In some implementations, an operator may be re-prompted to later re-verify the one or more locations. For example, where the software platform determines a change in one or more devices or network devices to which registered devices connect to access a network, the software platform may request that one or more operators thereof re-verify locations of their devices within a premises and hence re-verify locations of the premises itself. In another example, the software platform may ask an operator to re-verify one or more locations within the premises on a periodic basis, such as once per month, once per year, or at a different rate.

At 1104, a map of locations for the premises is generated. The map of locations for the premises may have one or more forms. In some cases, the map of locations may be a two-dimensional or three-dimensional model of the premises which represents some or all parts (e.g., buildings, floors, suites, rooms, etc.) of the premises. In other cases, the map of locations may be a simple table or other data store for associating identified locations with certain aspects present at the premises. For example, upon the verification of a location by an operator of a device, information associated with a network device through which the device connects to access a network, for example, to enable the verification of the location within the premises with the software platform, may be obtained. The information associated with the network device may, for example, include an IP address or BSSID of the network device. Hence, the map of locations may include a list of network information for one or both of devices registered with the software platform or network devices to which ones of the devices connect to access a network.

In some implementations, a network device through which a device connects to access a network may be or include a network switch. For example, data associated with the network switch, such as a MAC address and/or a port identifier, may be used to determine the location of the device within the premises, such as for generating the map of locations. The port identifier identifies one or more of a port name, a port number, or a port label for a network switch.

At 1106, the map of locations is stored for later use with the software platform. For example, the map of locations may be stored within a database or other data store accessible by the customer of the software platform.

At 1108, the software platform detects an emergency call from a device registered with the software platform and located at the premises. The software platform includes a telephony server for processing VOIP calls from registered devices. The software platform thus receives bitstreams for the calls and can parse them to determine whether a call is an emergency call.

At 1110, a location of the device is determined using the map of locations. For example, determining the location of the device using the map of locations may include identifying an IP address or BSSID of a network device through which the device connects to access the network and then comparing that IP address or BSSID to a list of network information stored as part of or in connection with the map of locations. For example, the map of locations may be searched based on information associated with the network device through which the device connects to access a network, such as an IP address or BSSID thereof. In another example, determining the location of the device using the map of locations may include identifying data associated with a network switch through which the device connects to access a network. The data associated with the network switch may, for example, be, include, or refer to one or both of a MAC address or a port identifier for the network switch.

At 1112, information associated with the device location is signaled to a PSAP to which the emergency call is routed. The information associated with the device location includes information determined using the map of locations and which is capable of directing an emergency responder to the location of device, and thus to the location of the emergency event. For example, the information associated with the device location may include one or more of a street address, a building identifier, a floor number, a suite number, a room identifier, a business name, or the like. The information associated with the current location of the device is signaled to the PSAP by the software platform appending or embedding the information associated with the current location of the device to or within a bitstream of the emergency call. The PSAP thus receives the emergency call with the signaled device location information and can immediately begin the process of dispatching emergency responders to the emergency event location accordingly.

In some implementations, the location of the device as determined using the map of locations may be used to visually represent a location of the emergency event within a map of the premises. For example, the map of the premises may be a two-dimensional or three-dimensional map of the premises manually or automatically generated for the customer of the software platform. In some such implementations, the map of the premises including the visual representation of the location of the emergency event may be output for display, for example, at a digital signage display within or external to the premises, such as to alert operators of the software platform, passerby, and/or first responders as to the emergency event and the location thereof.

In some implementations, the map of locations may extend beyond the premises of the customer. For example, the map of locations can include data points for locations of devices located within a premises and devices located external to the premises. In this way, the customer of the software platform can build a map of all devices registered for it to the software platform, such as to maintain accurate emergency location monitoring for personnel of the customer. In such an implementation, the manner by which the location of the device is verified, determined responsive to the detection of an emergency call, and signaled to a PSAP is the same as described above regardless of whether the subject device is located within or external to the premises.

Referring last to FIG. 12, a flowchart of an example of the technique 1200 for determining location information for devices registered with a software platform is shown. At 1202, a network device to which a device registered with the software platform connects to access a network is determined. The network device may, for example, be a wireless access point, a network switch, or another network device configured to connect one or more devices to a network. For example, the network device may be determined based on a BSSID of the network device, using gateway information obtained from the device, or in a like manner. In another example, where the network device is a network switch, the network device may be determined based on one or both of a MAC address or a port identifier. The network device may be identified using a network protocol suitable for discovering network devices, for example, the link layer discovery protocol (LLDP).

At 1204, an operator of the software platform is prompted to identify a location of the device. The location may, for example, be a location unknown to the software platform. The device may output a user interface prompting the operator to input or verify device location information for the device. For example, where the software platform recognizes the determined network device as being in a particular location within a premises of a customer or external to the premises, the user interface can include that location with a request for the operator to verify that the device is in fact located there. For example, where the device is external to the premises, the software platform may determine one or both of a street address or business name associated with the expected location of the device using information associated with the determined network device, and the operator may be prompted to verify the street address and/or the business name, as applicable. In another example, where the network device is a network switch, the location of the device within a premises of the customer can be triangulated using the network switch, for example, based on a subnet configured for the network switch.

In some implementations, the operator of the software platform may be prompted to identify the location of the device before the network device is determined. For example, where the location of the device can be determined without using information associated with the network device, the order in which the network device is determined and the location of the device is identified may be interchangeable.

In some implementations, map information for a premises of the customer of the software platform can be accessed to identify a defined name for a location within the premises. For example, a map of the premises may have previously been generated in which different parts of the map have been given names and are identifiable based on a network device located within or nearby those respective parts. In some such implementations, the operator of the device may be prompted to verify that the defined name for a part of the premises the device is expected to be located in actually corresponds to the location of the device.

At 1206, a record of the software platform is generated to indicate the location of the device and information associated with the network device. The record is one of a number of records stored by the software platform for detecting locations of devices. Where the software platform already includes a record for the device at the identified location, a new record will not be generated. Thus, the software platform may optionally check existing records for a record of the device at the identified location before generating the record. Multiple records may be generated for the same device based on network device connections. For example, a first record may be generated for a device where a determination is made that the device connects to a network through a first network device, and a second record may be generated for the same device where a determination is made that the device connects to a network (e.g., the same network or a different network) through a second network device. A device location may be considered to be registered with the software platform upon the generation of record therefor.

In some implementations, where a record of the device at the identified location already exists but includes information about a different network device, the record may be updated to include information about the newly determined network device instead or in addition to the different network device.

At 1208, the software platform detects an emergency call from the device. The software platform includes a telephony server for processing VOIP calls from registered devices. The software platform thus receives bitstreams for the calls and can parse them to determine whether a call is an emergency call.

At 1210, a current location of the device is determined using one or more records of the software platform. Where PIDF-LO signaling is enabled, responsive to detecting the emergency call, the software platform searches through records of device locations based on some information associated with the device, for example, the operator thereof, a phone number associated therewith, an IP address thereof, a BSSID or MAC address of a network device through which the device connects to access a network (and/or a port identifier where the network device is a network switch), or the like. Upon a record being identified, a location of the device as indicated within the record is identified. The location of the emergency event is considered to be the location of the device from which the emergency call was placed at the time of the emergency call, unless indicated otherwise such as by the operator of that device. Alternatively, where PIDF-LO signaling is not enabled, an address of public record associated with an ELIN of the device from which the emergency call is received is used as the location of the emergency event. For example, the ELIN of the device may be signaled as an output caller ID number. The PSAP can receive the emergency call and, upon identifying that the caller ID number signaled is the same as the ELIN of the device, perform a database lookup to retrieve the address of record for the device.

At 1212, information associated with the current location of the device is signaled to a PSAP. The information associated with the current location of the device includes some location information capable of directing an emergency responder to the location of device, and thus to the location of the emergency event. For example, the information associated with the current location of the device may include one or more of a street address, a building identifier, a floor number, a suite number, a room identifier, a business name, or the like. The information associated with the current location of the device is signaled to the PSAP by the software platform appending or embedding the information associated with the current location of the device to or within a bitstream of the emergency call. The PSAP thus receives the emergency call with the signaled device location information and can immediately begin the process of dispatching emergency responders to the emergency event location accordingly.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
  registering one or more first locations for a number of first devices registered with a unified communications as a service (UCaaS) platform and located at a premises associated with a customer of the UCaaS platform;

registering one or more second locations for a number of second devices registered with the UCaaS platform and located other than at the premises;

detecting that an emergency call is initiated from a device of the number of first device or of the number of second device while the device is at a registration location; and signaling, by the UCaaS platform, information associated with the registered location of the device to a public safety answering point to which the emergency call is routed.

2. The method of claim 1, wherein registering a first location of the one or more first locations comprises:

identifying a network device through which a first device of the number of first devices connects to access a network, wherein the network device is located at the premises;

prompting an operator of the first device to specify a location of the first device within the premises; and registering the location of the first device within the premises as the first location using information associated with the network device.

3. The method of claim 2, wherein registering the location within the premises at which the first device is located as the first location using information associated with the network device comprises:

generating a record for the first location, the record for the first location including the location of the first device within the premises, an IP address of the first device, and the information associated with the network device, wherein the information associated with the network device includes one or more of an IP address of a network device detected at the second location, a subnet range used by the network device, a BSSID of the network device, or a MAC address of the network device.

4. The method of claim 3, wherein, when the device is the first device and the registered location is the first location, detecting that the emergency call is initiated from the device while the device is at the registered location comprises:

responsive to detecting that the first device initiated the emergency call, identifying a current network device to which the first device is connected; and determining that the first device is at the first location by comparing information associated with the current network device against the record.

5. The method of claim 2, further comprising:

generating a visual representation of the first location within a digital map of the premises, wherein, responsive to the emergency call, the digital map including the visual representation of the first location is output to a digital signage display to indicate the first location as a location of an emergency event.

6. The method of claim 1, wherein registering a second location of the one or more second locations comprises:

responsive to determining that a second device of the number of second devices is at an unknown location, identifying a network device through which the second device connects to access a network, wherein the network device is located at the unknown location;

prompting an operator of the second device to indicate location information for the unknown location; and registering the unknown location as the second location using the indicated location information and the information associated with the network device.

7. The method of claim 6, wherein registering the unknown location as the second location using the indicated location information comprises:

generating a record for the second location, the record for the second location including the indicated location information, an IP address of the second device, and the information associated with the network device, wherein the information associated with the network device includes one or more of, an IP address of a network device detected at the second location, a subnet range used by the network device, a BSSID of the network device, or a MAC address of the network device.

8. The method of claim 6, wherein the unknown location is registered responsive to a verification of the location information indicated by the operator of the second device using a map service.

9. The method of claim 1, wherein the UCaaS platform concurrently signals the information associated with the registered location of the device to the public safety answering point and to a monitoring device registered with the UCaaS platform to enable an operator of the monitoring device to participate in the emergency call.

10. A non-transitory computer readable medium storing instructions operable to cause one or more processors to perform operations comprising:

registering one or more first locations for a number of first devices registered with a unified communications as a service (UCaaS) platform and located at a premises associated with a customer of the UCaaS platform;

registering one or more second locations for a number of second devices registered with the UCaaS platform and located other than at the premises;

detecting that an emergency call is initiated from a device of the number of first device or of the number of second device while the device is at a registration location; and signaling, by the UCaaS platform, information associated with the registered location of the device to a public safety answering point to which the emergency call is routed.

11. The method non-transitory computer readable medium of claim 10, wherein the registered location of the device is determined based on a network device to which the device is connected to access a network when the emergency call is initiated, and where the operations further comprise:

detecting, at a time prior to the emergency call, the network device;

responsive to detecting the network device, prompting an operator of the device to verify the location of the device; and generating a record of the records to associate the information associated with the network device with the location of the device.

12. The non-transitory computer readable medium of claim 11, wherein the device is one of the first devices and the network device is a network switch, wherein the location of the device within the premises is triangulated using the network switch.

13. The non-transitory computer readable medium of claim 10, wherein records of the UCaaS platform correspond to registered locations of the first devices and of the second devices.

14. The non-transitory computer readable medium of claim 13, wherein a record generated for a first device of the first devices indicates at least a street address, a building identifier, and a floor of the premises at which the first device is located, and wherein a record generated for a second device of the second devices indicates at least a street address of a location of the second device.

15. An apparatus, comprising:
a memory; and
a processor configured to execute instructions stored in the memory to:
register one or more first locations for a number of first devices registered with a unified communications as a service (UCaaS) platform and located at a premises associated with a customer of the UCaaS platform;
register one or more second locations for a number of second devices registered with the UCaaS platform and located other than at the premises;
detecting that an emergency call is initiated from a device platform of the number of first device or of the number of second device while the device is at a registration location; and
signal, by the UCaaS platform, information associated with the registered location of the device to a public safety answering point to which the emergency call is routed.

16. The apparatus of claim 15, wherein, to register a first location of the one or more first locations, the processor is configured to execute the instructions to:
registering a first location of a first device within the premises based on location information associated with a network device through which the first device connects to access a network.

17. The apparatus of claim 15, wherein, responsive to the emergency call, a digital map of the premises including a visual representation of a first location of a first device is output to a digital signage display to indicate the first location as a location of an emergency event.

18. The apparatus of claim 15, wherein registering a second location of the one or more second locations comprises:
registering, as the second location, an unknown location at which a second device is detected using location information indicated by an operator of the second device and location information associated with a network device through which the second device connects to access a network.

19. The apparatus of claim 15, wherein a record generated based on a registration of a first location includes a location of a first device within the premises, an IP address of the first device, and location information associated with a network device through which the first device connects to access a network at the premises.

20. The apparatus of claim 15, wherein, to signal the information associated with the registered location of the device to the public safety answering point, the processor is configured to execute the instructions to:
concurrently signal the information associated with the registered location of the device to the public safety answering point and to a monitoring device registered with the UCaaS platform to enable an operator of the monitoring device to participate in the emergency call.

* * * * *